United States Patent
Ishida et al.

(10) Patent No.: US 7,478,696 B2
(45) Date of Patent: Jan. 20, 2009

(54) MOTORCYCLE WITH LOWERED CENTER OF GRAVITY

(75) Inventors: Yousuke Ishida, Shizuoka-ken (JP); Akifumi Oishi, Shizuoka-ken (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 540 days.

(21) Appl. No.: 11/260,712

(22) Filed: Oct. 27, 2005

(65) Prior Publication Data

US 2006/0090945 A1  May 4, 2006

(30) Foreign Application Priority Data

Oct. 29, 2004  (JP) .............................. 2004-315988

(51) Int. Cl.
- *B62D 61/02* (2006.01)
- *B62K 11/00* (2006.01)
- *B62M 7/00* (2006.01)

(52) U.S. Cl. ...................................... 180/219; 180/228

(58) Field of Classification Search ................. 180/219, 180/228, 230

See application file for complete search history.

(56) References Cited

U.S. PATENT DOCUMENTS

| 3,811,528 A | * | 5/1974 | Hooper ....................... 180/228 |
| 7,044,253 B2 | * | 5/2006 | Takenaka et al. ............ 180/219 |

FOREIGN PATENT DOCUMENTS

JP  2001-003723  9/2001

* cited by examiner

*Primary Examiner*—Paul N Dickson
*Assistant Examiner*—Marc A Scharich
(74) *Attorney, Agent, or Firm*—Knobbe, Martens, Olson & Bear, LLP

(57) ABSTRACT

A motorcycle has a frame and a power unit. The frame comprises a main frame member extending rearward from a steering head pipe. The power unit comprises a drive source, power transmission devices attached to the output end of the drive source, and a casing that houses the power transmission devices and that is suspended from the main frame member. The casing of the power unit comprises a recess opening toward the main frame member. A boss is formed on the bottom of the recess and is suspended from the main frame member.

11 Claims, 8 Drawing Sheets

MOTORCYCLE WITH LOWERED CENTER OF GRAVITY

CROSS-REFERENCE TO RELATED APPLICATIONS

This application claims priority to Japanese Patent Application No. 2004-315,988, filed on Oct. 29, 2004, which is hereby incorporated by reference in its entirety.

BACKGROUND OF THE INVENTION

1. Field of the Invention

The present invention generally relates to a small motor vehicle with a power unit that comprises an engine and a belt-driven continuously variable transmission. More particularly, the present invention relates to a structure for mounting the power unit relative to a vehicle frame.

2. Description of the Related Art

Small motor vehicles that are mainly used for commuting or for light-duty business purposes typically have a backbone-type frame. The frame generally comprises a steering head pipe that supports a front fork and a main frame member that extends rearward from the steering head pipe.

The main frame member forms the primary structure of the frame. Brackets are secured to an intermediate portion of the main frame member. The brackets are used to suspend the crankcase of an engine. The brackets protrude downward from the main frame member. The crankcase of the engine has protrusions at its upper front and rear ends. The protrusions extend upward from the topside of the crankcase and are secured to the lower ends of the brackets by bolts. Such a construction is shown in Japanese Published Application No. 2001-0003723, for example.

As shown in the Japanese reference, the joints between the brackets and the protrusions are located between the topside of the crankcase and the main frame member. In such a configuration, because space must be provided between the topside of the crankcase and the main frame member to accommodate the boss parts and the brackets, the distance between the crankcase and the main frame member is unavoidably enlarged.

The vertical position of the engine above the road surface is related to the characteristics of the terrain expected to be encountered. In other words, the engine needs to be sufficiently elevated above the road surface to reduce the likelihood that the engine will contact the road surface during operation. The position of the main frame member is determined by the position of the engine. As such, the main frame member is generally located significantly above the road surface. A seat is supported on the main frame member, which means that the elevation of the seat above the road surface also is relatively high. The relatively high position of the seat can make it difficult for a rider to put both feet on the ground easily while the vehicle is stopped.

SUMMARY OF THE INVENTION

It is, therefore, an object of the present invention to obtain a motorcycle where the main frame member is lowered as much as possible while providing sufficient clearance from the road surface. The casing of the preferred power unit comprises a recess opening toward the main frame member and a boss part is formed on the base of the recess. The boss is suspended from the main frame member. Preferably, the boss does not largely protrude upward from the casing of the power unit such that the distance between the casing and the main frame member can be reduced. Thus, the position of a main frame member can be lowered with the minimum height of the power unit above the ground maintained.

One aspect of the present invention involves a motorcycle comprising a steering head pipe. A main frame member extends rearward from the steering head pipe. A power unit comprises a drive source and a power transmission device that is attached to the output end of the drive source. The power transmission device is positioned within a casing. The casing comprises a recess that opens toward the main frame member. A boss is formed on the base of the recess. The boss is suspended from the main frame member such that the power unit is suspended from the main frame member.

Another aspect of the present invention involves a motorcycle that comprises a frame. The frame comprises a steering head pipe and a main frame member that extends rearward from the steering head pipe. A power unit is suspended from the main frame member of the frame. The power unit comprises a drive source. The drive source comprises a casing. A continuously variable transmission is attached to the casing of the drive source and comprises a portion that extends upward to a location generally vertically higher than the casing. The casing comprises a boss that is suspended from the main frame member. The boss is disposed on an upper portion of the casing and the boss is provided in such a position that it overlaps an upper portion of the continuously variable transmission when the power unit is viewed from a side.

BRIEF DESCRIPTION OF THE DRAWINGS

These and other features, aspects and advantages of the present invention will now be described with reference to the drawings of a preferred embodiment, which embodiment is intended to illustrate and not to limit the invention, and in which figures.

DETAILED DESCRIPTION OF THE PREFERRED EMBODIMENT

Figure 1:
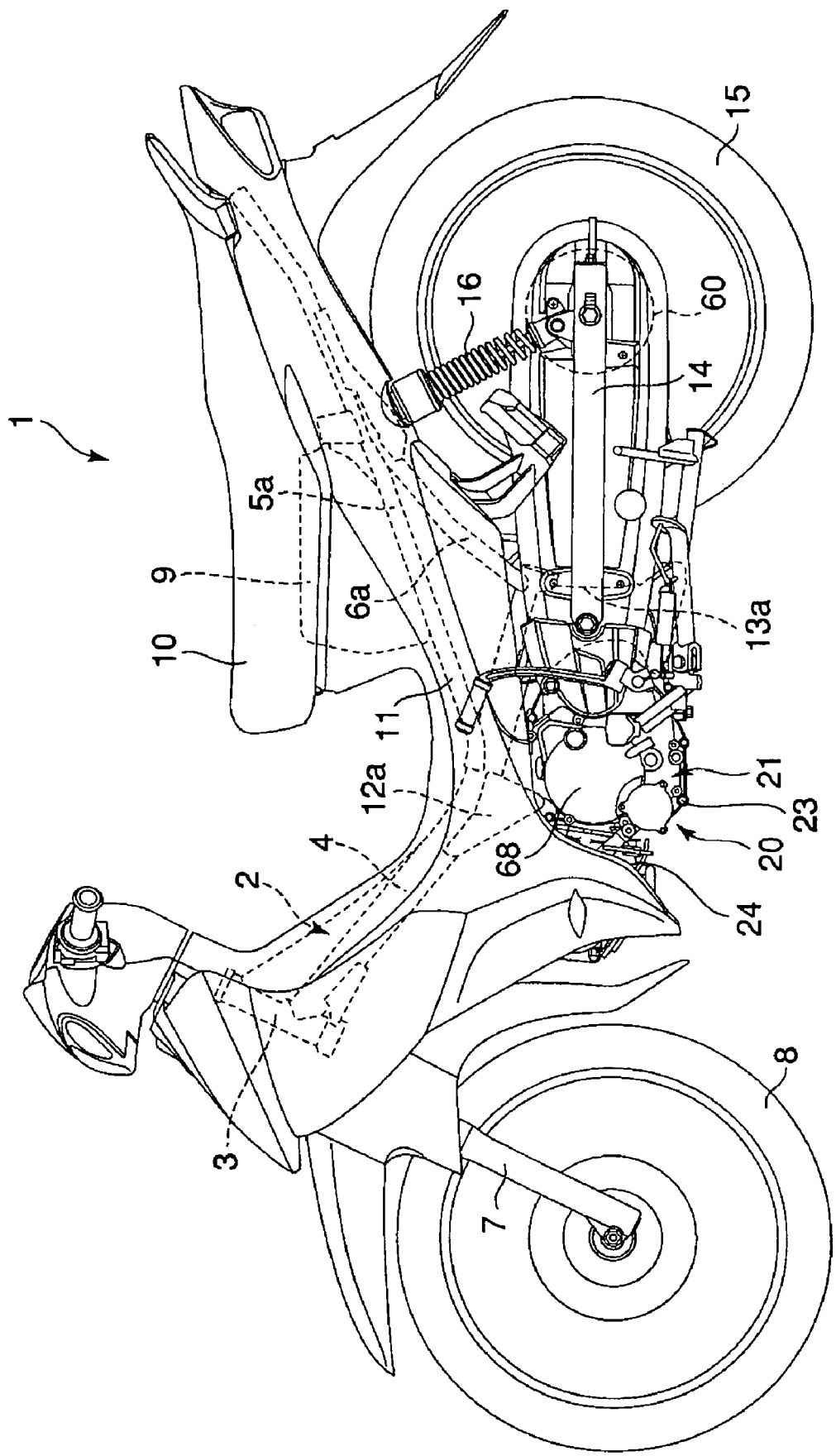
FIG. 1 is a side view of a motorcycle that is arranged and configured in accordance with certain features, aspects and advantages of the present invention.

With reference now to FIG. 1, a motorcycle 1 is shown that comprises a backbone-type frame 2. The frame 2 comprises a steering head pipe 3, a main frame member 4 that extends rearward from the steering head pipe 3, right and left seat rails 5a, 5b that extend upward from the main frame member 4 and right and left seat pillar tubes 6a, 6b that extend upward from the main frame member 4 rearward of the right and left seat rails 5a, 5b.

The steering head pipe 3 is located at the forward end of the frame 2. The steering head pipe 3 supports a front wheel 8 via a front fork 7. The main frame member 4 defines the primary structure of the illustrated frame 2 and can be made, for example, of a steel pipe that has a generally circular cross-section. In some configurations, the main frame member 4 has other shapes, including, for instance but without limitation, a boxlike construction in cross section. The main frame member 4 can be formed by welding articles formed by press forming or extrusion, for example. Any other suitable configuration also can be used. The main frame member 4 preferably is connected to, and extends rearward from, the steering head pipe 3. The illustrated main frame member 4 inclines downward from front to rear. In some configurations, the main frame member is formed of two pipes or a forked pipe forming two branches united at one end. Other configurations also are possible.

The illustrated seat rails 5a, 5b extend generally rearward from an intermediate portion of the main frame member 4. Advantageously, the seat rails 5a, 5b are transversely spaced from each other (i.e., spaced apart in the vehicle width direction). The illustrated seat pillar tubes 6a, 6b connect a rear portion of the main frame member 4 to intermediate portions of the respective seat rails 5a, 5b. Thus, the seat pillar tubes 6a, 6b support the seat rails 5a, 5b from below.

A fuel tank 9 and a rider's seat 10 are supported on the seat rails 5a, 5b. The fuel tank 9 is located on the front halves of the seat rails 5a, 5b. The seat 10 extends from a position above the fuel tank 9 to the rear ends of the respective seat rails 5a, 5b. The fuel tank 9 and the frame 2 can be covered with a body cover 11.

Figure 2:
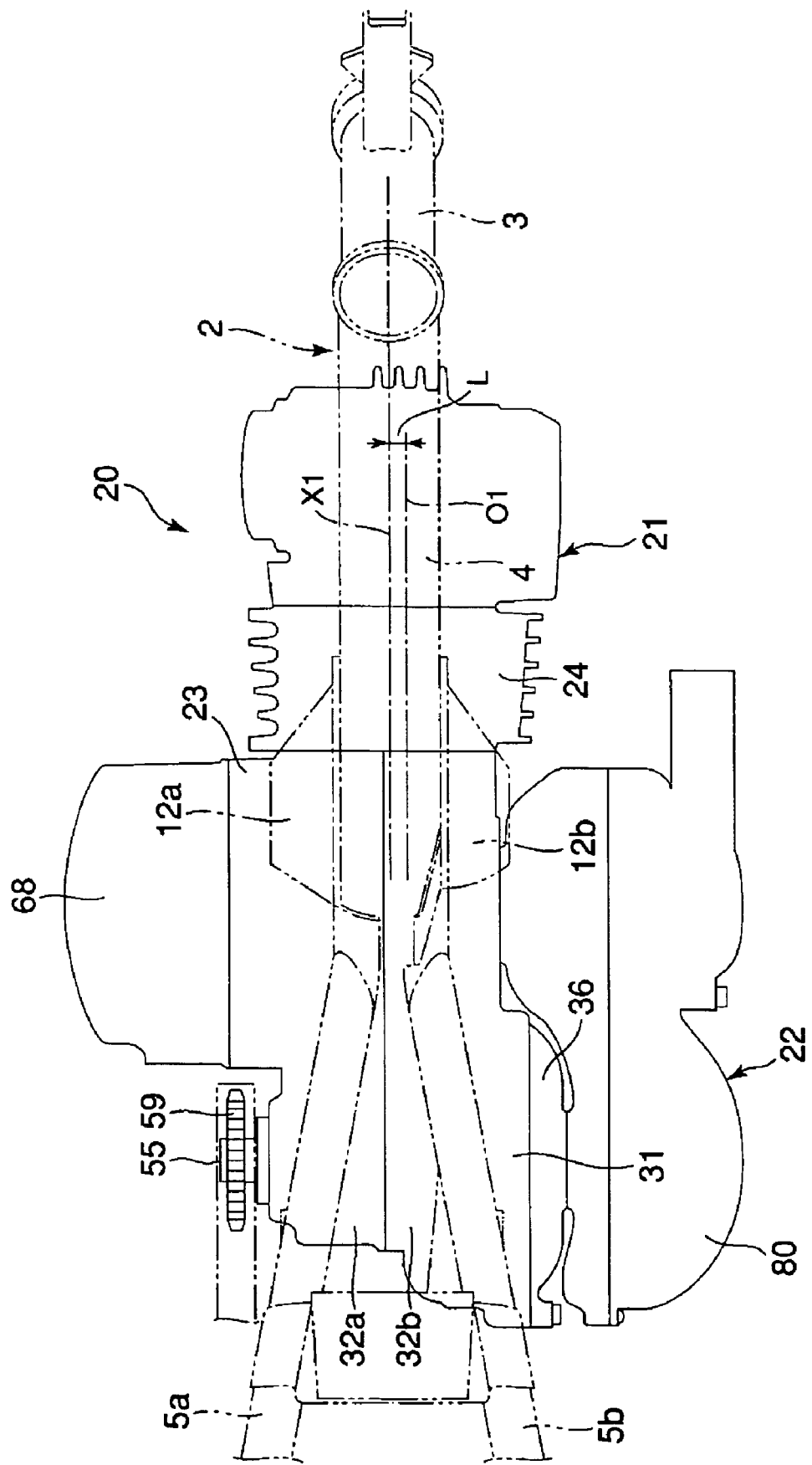
FIG. 2 is a top plan view, illustrating the positional relation between a frame and a power unit of FIG. 1.
Figure 3:
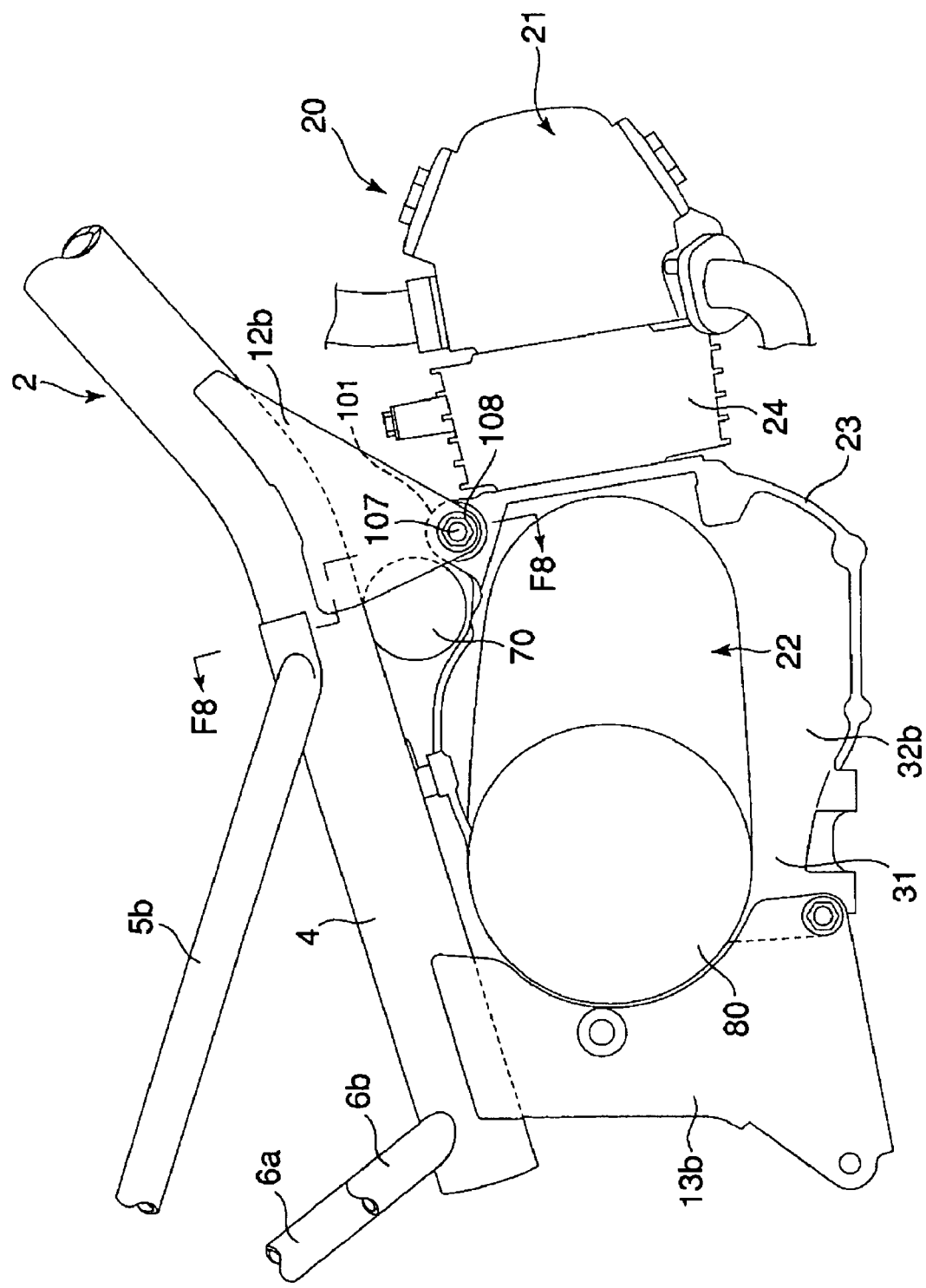
FIG. 3 is a right side view, illustrating the positional relation between the frame and the power unit of FIG. 1.
Figure 4:
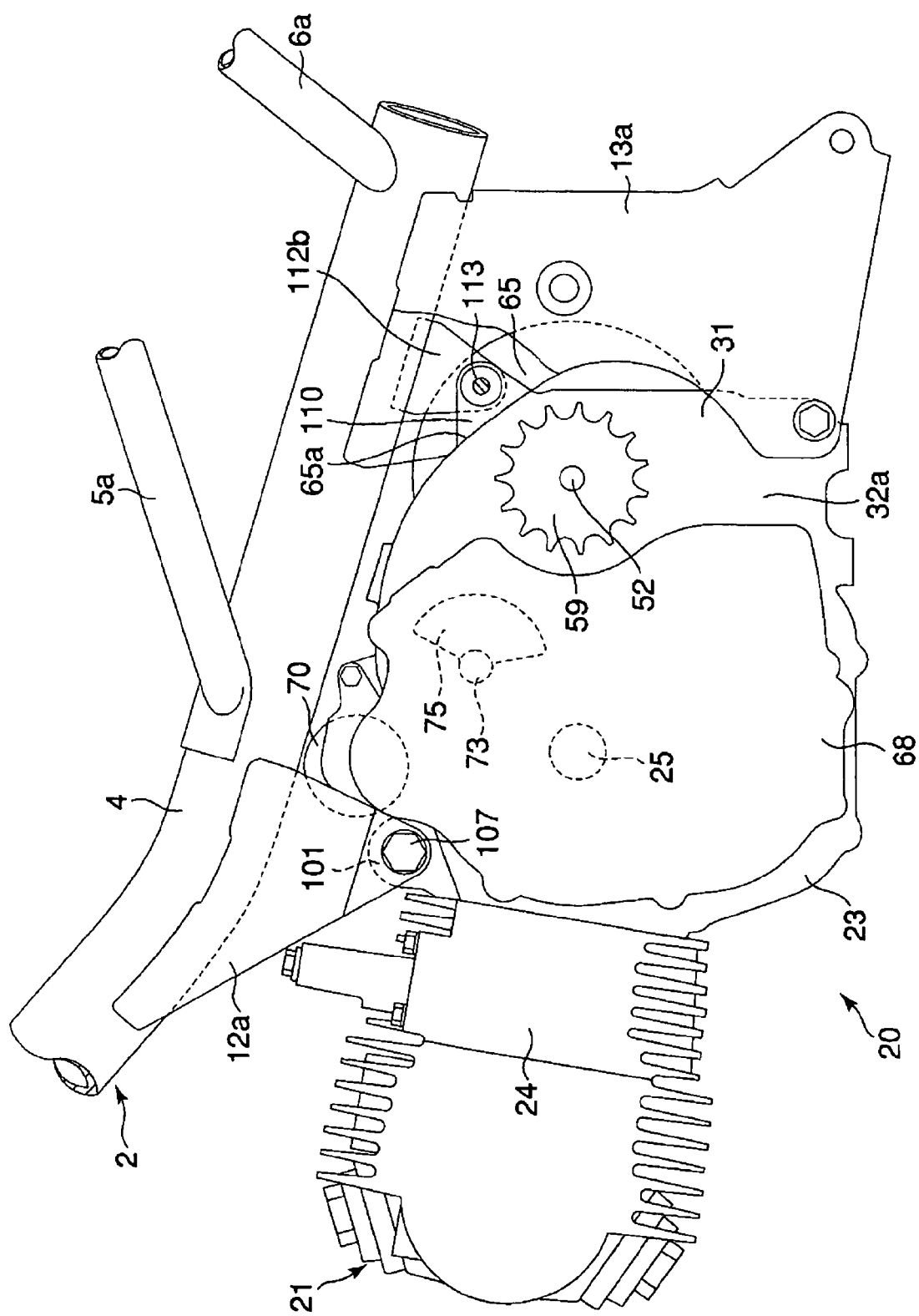
FIG. 4 is a left side view, illustrating the positional relation between the frame and the power unit of FIG. 1.

With reference now to FIG. 2 through FIG. 4, a pair of first engine brackets 12a, 12b is secured to an intermediate portion of the illustrated main frame member 4. In the illustrated embodiment, the first engine brackets 12a, 12b depend from the intermediate portion of the main frame member 4. The first engine brackets 12a, 12b preferably face toward each other while being transversely spaced from each other (i.e., separated by a distance in the vehicle width direction).

A pair of rear arm brackets 13a, 13b preferably is secured to the rear portion of the main frame member 4. The rear arm brackets 13a, 13b also depend from the main frame member 4. In the illustrated embodiment, the rear arm brackets 13a, 13b depend from the rear portion of the main frame member 4. Preferably, the rear arm brackets 13a, 13b face toward each other while being transversely spaced from each other (i.e., separated by a distance in the vehicle width direction).

Preferably, the rear arm brackets 13a, 13b are designed to support a rear arm 14. The rear arm 14 extends backward from the rear arm brackets 13a, 13b and a rear wheel 15 can be supported at the rear end of the rear arm 14. The rear arm 14 preferably is suspended relative to the frame 2 by any suitable suspension component. In the illustrated embodiment, a shock absorber 16 extends between the frame 2 and a rear portion of the rear arm 14.

Figure 5:
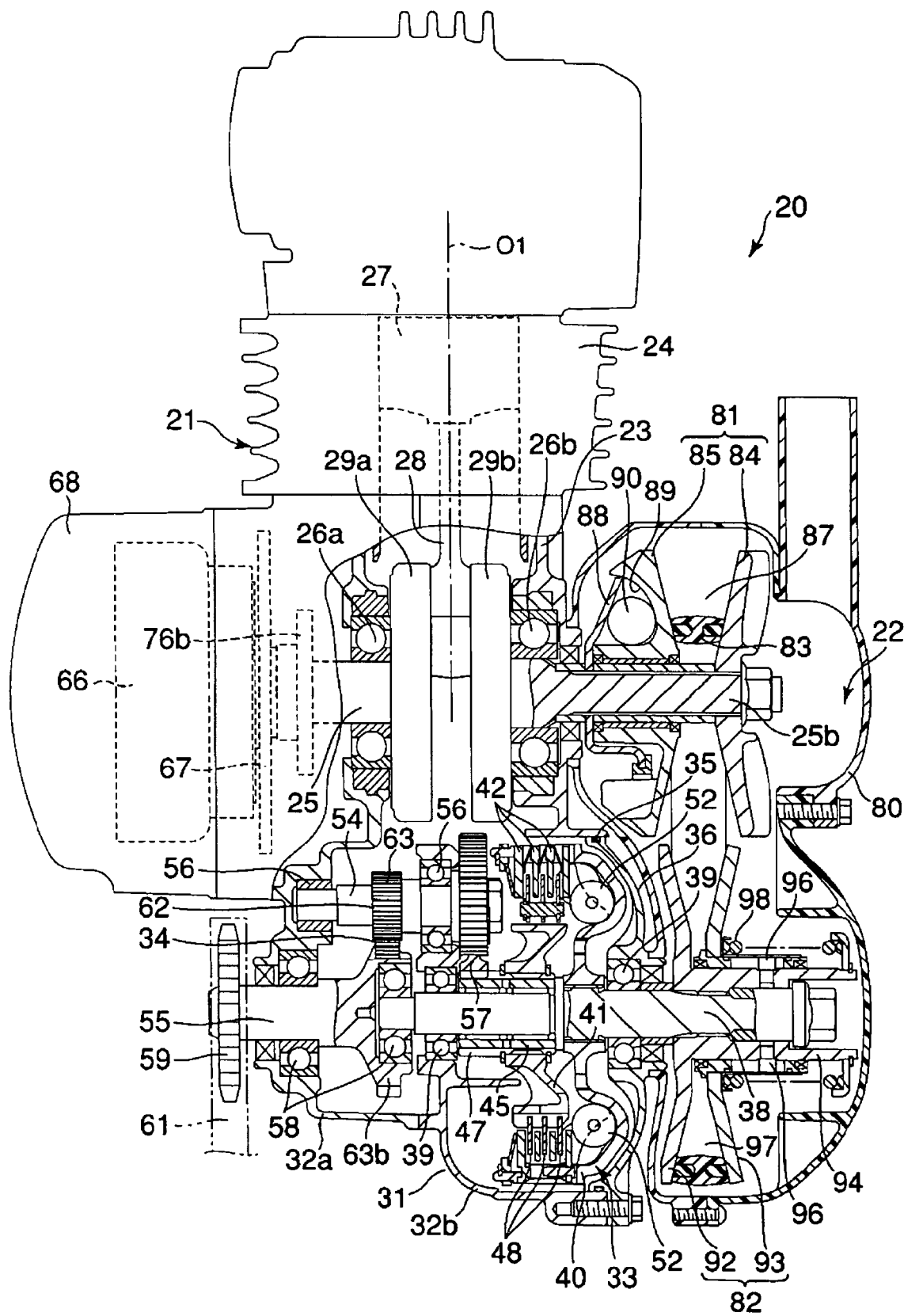
FIG. 5 is a cross-sectional view, showing the internal structure of the power unit of FIG. 1.

In the illustrated embodiment, a power unit 20 is located below the main frame member 4 and supported by the frame 2. The power unit 20 provides motive power to the rear wheel 15. As shown in FIG. 3 to FIG. 5, the power unit 20 can comprise, for example, a four-cycle single-cylinder engine 21 as a drive source and a belt-driven continuously variable transmission (hereinafter referred to as CVT) 22. Other types of engines (e.g., other operating principles and other numbers of cylinders in any suitable block configuration) can be used.

In addition, the drive source of the power unit can be an electric motor or a hybrid module in which an electric motor and an engine are combined. Also, other types of transmissions (e.g., manually shiftable, other types of CVTs, including those using rotating balls, etc.) can be used as well.

The illustrated engine 21 comprises a crankcase 23 and a cylinder 24 connected to the forward end of the illustrated crankcase 23. The crankcase 23 houses a crankshaft 25. The crankshaft 25 can be supported by the crankcase 23 via bearings 26a, 26b. In the illustrated embodiment, the crankshaft 25 extends generally horizontally in the vehicle width direction (i.e., the transverse direction).

The illustrated cylinder 24 protrudes forward from the front end of the crankcase 23 in a generally horizontal direction. Preferably, the cylinder 24 comprises an axis O1 that extends generally in the longitudinal direction of the power unit 20. The cylinder 24 houses a piston 27. The piston 27 is connected to crank webs 29a, 29b of the crankshaft 25 via a connecting rod 28.

As shown in FIG. 4 and FIG. 5, a transmission case 31 is formed integrally with a rear portion of the illustrated crankcase 23. Other configurations also are possible. In the illustrated configuration, the transmission case 31 is located behind the crankshaft 25. The crankcase 23 and the transmission case 31 can comprise a first case block 32a and a second case block 32b that are coupled together in any suitable manner.

In the illustrated embodiment, the first and second case blocks 32a, 32b are split in the transverse direction. In other words, the first case block 32a is located on the left side of the axis O1 of the cylinder 24 and the second case block 32b is located on the right side of the axis O1 of the cylinder 24. Other configurations also are possible.

With reference to FIG. 5, the illustrated transmission case 31 houses a centrifugal clutch 33 and a geared transmission 34. The centrifugal clutch 33 and the gear transmission 34, which form an example of a power transmission device, preferably are generally transversely aligned at a location rearward of the crankshaft 25.

In the illustrated configuration, the centrifugal clutch 33 is located in a rearward portion of the second case block 32b. The second case block 32b preferably has an opening 35 such that the centrifugal clutch 33 can be inserted into and removed from the transmission case 31 through the opening. In the illustrated configuration, the opening 35 opens at the right side of the rear portion of the second case block 32b and is closed by a disk-like clutch cover 36. Other configurations also are possible.

As illustrated, the centrifugal clutch 33 preferably is supported on an output shaft 38. The output shaft 38 can be supported by the clutch cover 36 and the second case block 32b via bearings 39. The illustrated output shaft 38 extends generally parallel to the crankshaft 25. The right end of the illustrated output shaft 38 preferably extends through the clutch cover 36 into the transmission case 31.

Figure 6:
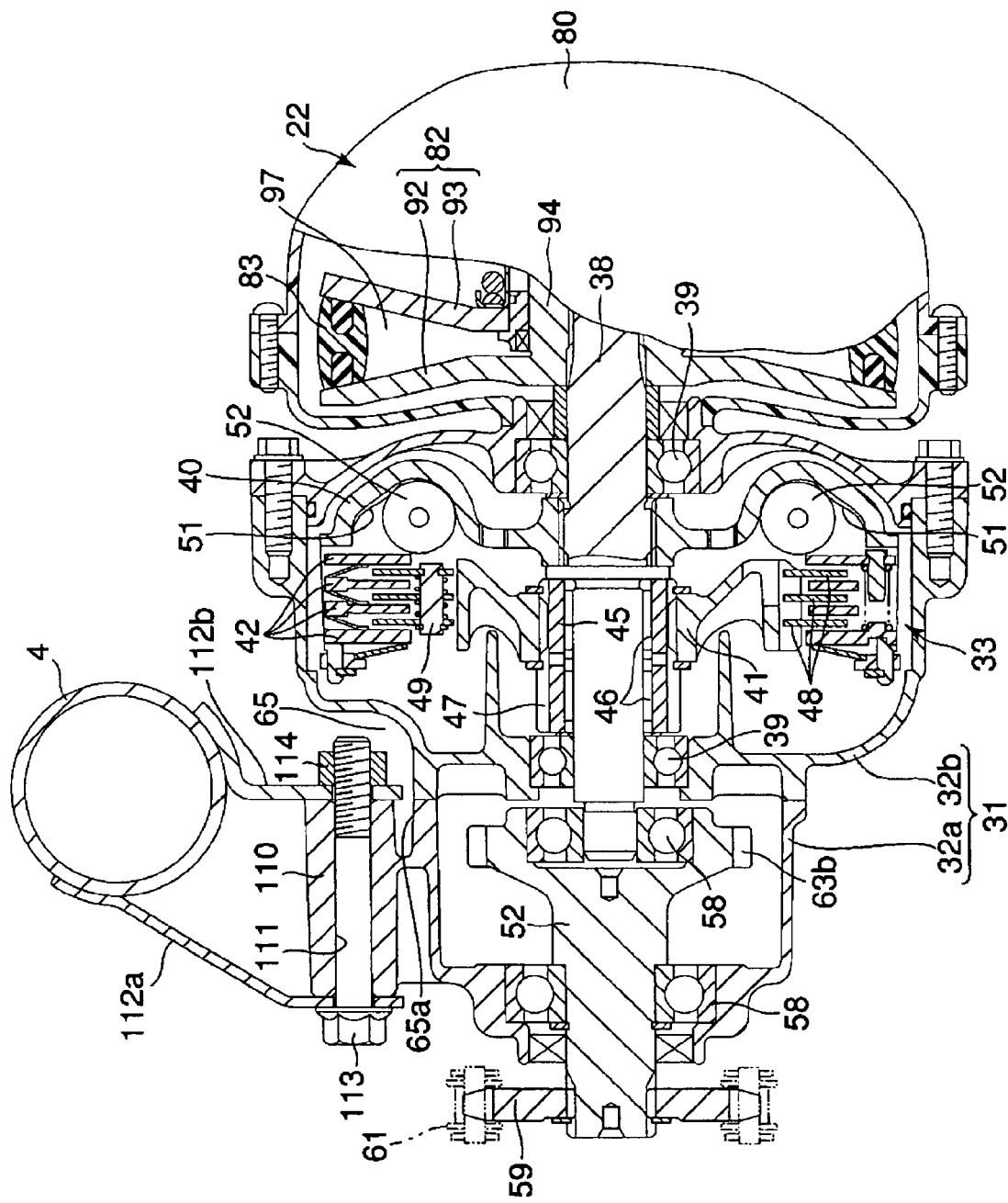
FIG. 6 is another cross-sectional view, illustrating the positional relation among second engine brackets for suspending the rear end of a transmission case, a secondary sheave of a belt-driven continuously variable transmission and a centrifugal clutch of FIG. 1.

With reference to FIG. 6, the centrifugal clutch 33 preferably has a cylindrical clutch housing 40 and a clutch boss 41 located in the clutch housing 40. The clutch housing 40 is supported on the output shaft 38 for rotation with the output shaft 38. The illustrated clutch housing 40 supports a plurality of clutch plates 42. The clutch plates 42 are rotatable together with the clutch housing 40 and are arranged coaxially in spaced relationship to each other along the axial direction of the output shaft 38.

The illustrated clutch boss 41 can be located inside the clutch plates 42. The output shaft 38 preferably extends through the center of the clutch boss 41. A generally cylindrical intermediate shaft 45 can be interposed between the clutch boss 41 and the output shaft 38. The intermediate shaft 45 can be rotationally supported on the output shaft 38 via a pair of bearings 46. The intermediate shaft 45 is rotationally coupled to the clutch boss 41 such that the intermediate shaft 45 and the clutch boss 41 rotate together. The intermediate shaft 45 comprises an output gear 47. The output gear 47 preferably is generally aligned with the clutch boss 41 on the output shaft 38.

The clutch boss 41 advantageously supports a plurality of friction plates 48. The friction plates 48 can be coaxially supported via a pin 49 and can be rotatable together with the clutch boss 41. The friction plates 48 can be interposed between the clutch plates 42 such that the friction plates 48 generally face the clutch plates 42.

With continued reference to FIG. 6, the clutch housing 40 comprises a plurality of cam faces 51. Each cam face 51 approaches the clutch plate 42 in the radially outward direction of the clutch housing 40. Roller weights 52 are interposed between the illustrated cam faces 51 and one of the clutch plates 42 that is generally adjacent to the cam faces 51.

The roller weights 52 move in the radial direction of the clutch housing 40 in proportion to the centrifugal force generated by rotation of the clutch housing 40. More specifically, when the centrifugal force applied to the roller weights 52 reaches a predetermined value, the roller weights 52 start moving radially outward along the clutch housing 40 on the cam faces 51. The radial movement results in axial movement due to the shape and structure of the cam faces 51. The axial movement causes the roller weights 52 to press against the clutch plates 42. As a result, the clutch plates 42 and the friction plates 48 are brought into pressure contact with each other and the centrifugal clutch 33 is shifted to a clutch-in state to permit transmission of torque.

When the centrifugal force applied to the roller weights 52 decreases, the roller weights 52 move axially away from the clutch plates 42 and radially inward along the clutch housing 40. Contact between the clutch plates 42 and the friction plates 48 is released and the centrifugal clutch 33 is shifted to a clutch-off state to disconnect the transmission of torque.

With reference again to FIG. 5, the gear transmission 34 preferably is located at the output end of the centrifugal clutch 33. The illustrated gear transmission 34 comprises a first speed changing shaft 54 and a second speed changing shaft 55. The first speed changing shaft 54 can be supported by a rear portion of the transmission case 31 via one or more bearings 56. An input gear 57 can be secured to the right end of the first speed changing shaft 54. The input gear 57 engages with the output gear 47 on the intermediate shaft 45. Because of the meshing engagement, the clutch boss 41 of the centrifugal clutch 33 and the first speed changing shaft 54 are rotatable together.

The second speed changing shaft 55 also can be supported by a rear portion of the transmission case 31. The second speed changing shaft 55 also can be supported by bearings 58. In the illustrated configuration, the second speed changing shaft 55 extends generally coaxially with the output shaft 38. The left end of the second speed changing shaft 55, that is, the end of the second speed changing shaft 55 opposite the output shaft 38, preferably extends into a space within the transmission case 31 that is found to the left side of the vehicle. A drive sprocket 59 can be secured to the left end of the second speed changing shaft 55. A chain 61 can be entrained around the drive sprocket 59 and a driven sprocket 60 of the rear wheel 15.

In the illustrated embodiment, the first and second speed changing shafts 54 and 55 extend in the transverse direction.

The first and second speed changing shafts 54, 55 also preferably are disposed generally parallel to each other while being suitably spaced apart from each other. The rotation of the first speed changing shaft 54 is transmitted to the second speed changing shaft 55 via a gear train 62. Any suitable gear train can be used. In the illustrated configuration, the gear train 62 has a first speed changing gear 63a rotatable together with the first speed changing shaft 54 and a second speed changing gear 63b rotatable together with the second speed changing shaft 55. Thus, the first and second speed changing gears 63a, 63b mesh together and couple the two shafts 54, 55 together for rotation.

As shown in FIG. 5 and FIG. 6, the centrifugal clutch 33 also preferably is at least partially housed in the second case block 32b of the transmission case 31. The first and second speed changing gears 63a, 63b of the illustrated embodiment are housed in the first case block 32a of the transmission case 31. The gear train 62, which comprises the first and second speed changing gears 63a, 63b, preferably is located adjacent to the clutch housing 40 of the centrifugal clutch 33 in the vehicle width direction. The clutch housing 40 has an outer diameter greater than that of the gear train 62. Such a configuration provides an advantageously compact configuration.

At the rear end of the illustrated transmission case 31, the second case block 32b extends farther rearward than the first case block 32a and the upper surface of the first case block 32a is lower than the upper surface of the second case block 32b. As a result, a recess 65 is defined by the transmission case 31 that opens toward the main frame member 4 of the frame 2. In the illustrated configuration, the recess 65 is positioned at the rear portion of the transmission case 31. Preferably, the recess 65 is located on the left side of the centrifugal clutch 33 such that adequate clearance is provided for the centrifugal clutch 33.

Figure 7:
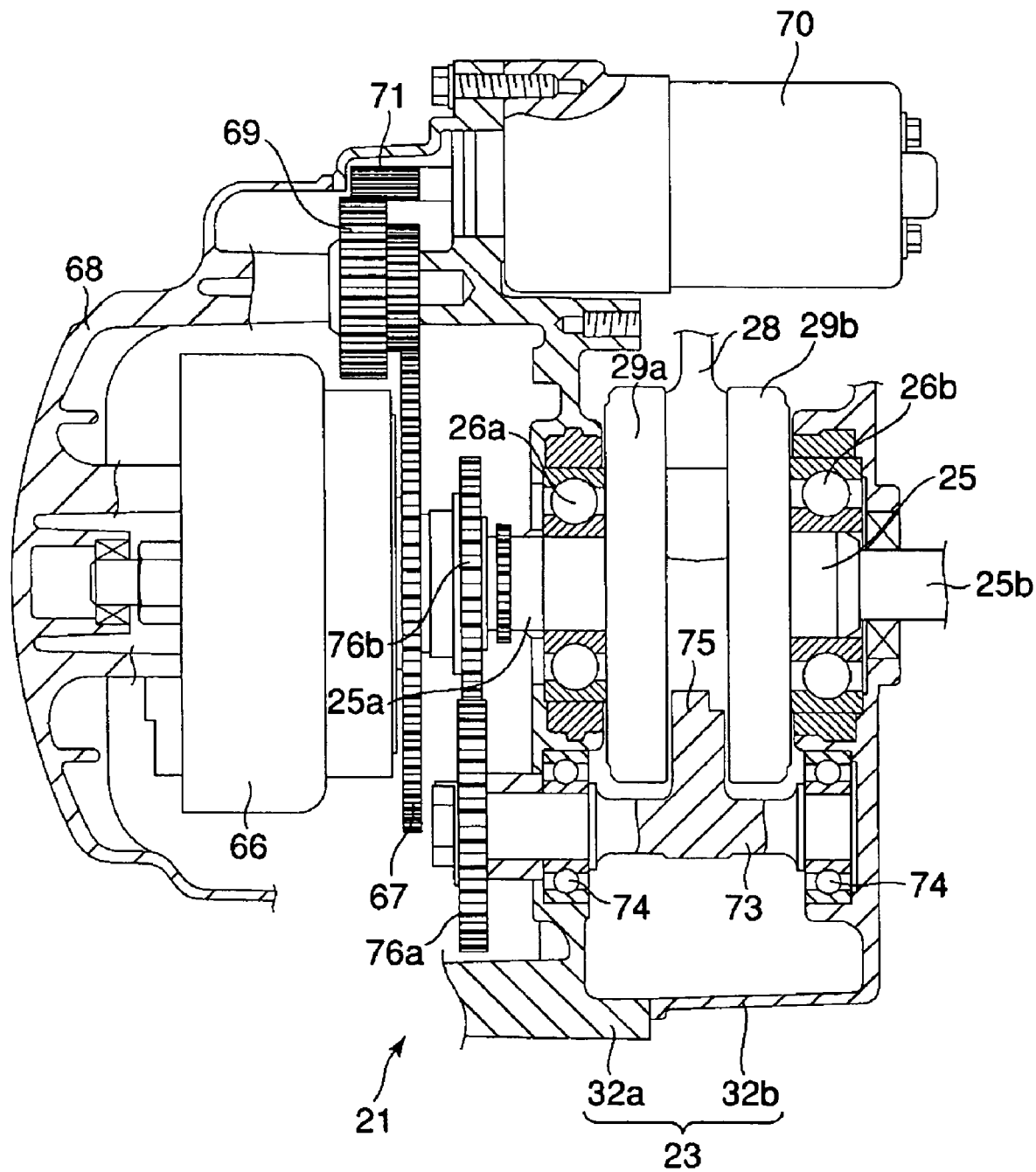
FIG. 7 is a further cross-sectional view of an engine, illustrating the positional relation among a crankshaft, a starter motor and a balancer shaft of FIG. 1.

With reference now to FIG. 7, an alternating-current magneto generator 66 and a starter gear 67 can be mounted on a left portion 25a of the crankshaft 25. The left portion 25a can be considered a left journal portion as the left portion 25a is supported by the bearing 26. Preferably, the alternating-current magneto generator 66 and the starter gear 67 are located on the left of the first case block 32a. The alternating-current magneto generator 66 can be covered with a case cover 68. In the illustrated embodiment, the case cover 68 is secured to the left side of a front half of the first case block 32a. Other configurations also are possible.

The starter gear 67 preferably meshes with a rotary shaft 71 of a starter motor 70 via a speed reduction gear 69. The starter motor 70 can be supported on the upper front end of the first case block 32a. In one configuration, the starter motor 70 is located right above the crankshaft 25. The starter motor 70 can be positioned outside the crankcase 23 and can be located between the crankcase 23 and the main frame member 4 in some configurations.

A balancer shaft 73 can also be housed within the crankcase 23. The illustrated balancer shaft 73 is located generally above the crankshaft 25 and preferably extends generally parallel with the crankshaft 25. The balancer shaft 73 can extend across the first and the second case block 32a, 32b, which in turn support the balancer shaft 73 via bearings 74. The balancer shaft 73 preferably has a balance weight 75 in the shape of a sector. The balance weight 75 can pass through a space between the crank webs 29a, 29b of the crankshaft 25.

The left end of the balancer shaft 73 extends through the first case block 32a and extends to the left of the first case block in the illustrated configuration. A first driving gear 76a is secured to the left end of the balancer shaft 73. The first driving gear 76a meshes with a second driving gear 76b secured to the journal part 25a of the crankshaft 25. Thus, the balancer shaft 73 is rotatable in a direction opposite the rotating direction of the crankshaft 25 at the same speed as the crankshaft 25.

In the illustrated embodiment, most of the route through which the torque of the starter motor 70 is transmitted to the crankshaft 25 and the route through which the torque of the crankshaft 25 is transmitted to the balancer shaft 73 are both located on the left side of a generally vertical plane that is defined by the axis O1 of the cylinder 24.

With reference now to FIG. 5, the CVT 22 is mounted on the right side of the second case block 32b. The CVT 22 extends in the longitudinal direction of the power unit 20 across the right side of the crankcase 23 and the right side of the transmission case 31.

The CVT 22 has a CVT case 80, a primary sheave 81, a secondary sheave 82, and a belt 83. The illustrated CVT case 80 has a hollow box-like shape and generally extends in the longitudinal direction of the power unit 20. The CVT case and the transmission case are formed separately in the illustrated configuration but the CVT case and the transmission case may be formed integrally with each other.

A journal part 25b at the right side of the crankshaft 25 and the right end of the output shaft 38 extend into the CVT case 80. The CVT case 80 houses the primary sheave 81, the secondary sheave 82, and the belt 83.

The primary sheave 81 is located at the front end in the CVT case 80 and is supported on the journal part 25b at the right end of the crankshaft 25. The primary sheave 81 has a fixed sheave half 84 and a movable sheave half 85. The fixed sheave half 84 is secured to the end of the journal part 25b and rotatable together with the crankshaft 25. The movable sheave half 85 is supported on the journal part 25b. The movable sheave half 85 is slideable toward and away from the fixed sheave half 84 and rotatable in a circumferential direction of the journal part 25b.

The fixed sheave half 84 and the movable sheave half 85 are inclined away from each other in the radially outward direction. A first belt groove 87 is formed between the fixed sheave half 84 and the movable sheave half 85. The width of the first belt groove 87 is adjustable by sliding the movable sheave half 85 toward and away from the fixed sheave half 84.

A cam plate 88 is fixed on the journal part 25b. The cam plate 88 is rotatable together with the crankshaft 25 and faces to the movable sheave half 85. The cam plate 88 and the movable sheave half 85 are rotatable together and movable toward and away from each other.

The movable sheave half 85 has a plurality of cam faces 89 (only one of them is shown) facing to the cam plate 88. Roller weights 90 are interposed between the cam faces 89 and the cam plate 88. The roller weights 90 are moved along the cam faces 89 in proportion to the centrifugal force generated by the rotation of the crankshaft 25. This movement causes the movable sheave half 85 to slide in the axial direction of the journal part 25b and the width of the first belt groove 87 is varied.

The secondary sheave 82 is located toward the rear end of the CVT case 80 and supported on the right end of the output shaft 38. The secondary sheave 82 has a fixed sheave half 92 and a movable sheave half 93. The fixed sheave half 92 has a cylindrical collar 94 around its center of rotation. The collar 94 engages with the right end of the output shaft 38 so as to be rotatable together with the output shaft 38. The movable sheave half 93 is mounted on the collar 94 for sliding movement in the axial direction and engages with the collar 94 via a plurality of engaging pins 96. Thus, the movable sheave half 93 is rotatable together with the fixed sheave half 92 and movable toward and away from the fixed sheave half 92.

The fixed sheave half 92 and the movable sheave half 93 are inclined away from each other in the radially outward direction. A second belt groove 97 is formed between the fixed sheave half 92 and the movable sheave half 93. The width of the second belt groove 97 is adjustable by sliding the movable sheave half 93. The movable sheave half 93 is urged in a direction to reduce the width of the second belt groove 97 by a compressed coil spring 98.

As shown in FIG. 5 and FIG. 6, the secondary sheave 82 is located adjacent the centrifugal clutch 33 on the output shaft 38. In the illustrated configuration, the primary sheave 81 and the secondary sheave 82 have a diameter generally equal to that of the clutch housing 40 of the centrifugal clutch 33. Thus, the height of the CVT case 80 is generally the same as that of the second case block 32b. At the rear end of the CVT case 80, the CVT case 80 protrudes upward farther than the rear end of the first case block 32a.

The belt 83 transmits the torque of the primary sheave 81 to the secondary sheave 82. The belt 83 is stretched between the belt groove 87 of the primary sheave 81 and the second belt groove 97 of the secondary sheave 82 in an endless fashion.

When the rotational speed of the crankshaft 25 is low such as when the engine 21 is idling, the roller weights 90 are positioned close to the center of rotation of the primary sheave 81. Thus, the movable sheave half 85 is positioned farthest away from the fixed sheave half 84 and the diameter at which the belt 83 rides on the primary sheave 81 is minimum. The movable sheave half 93 of the secondary sheave 82 has been pushed to a position closest to the fixed sheave half 92 by the compression coil spring 98. Thus, the belt 83 entrained around the second belt groove 97 has been pushed toward the outer periphery of the secondary sheave 82 and the diameter at which the belt 83 rides on the secondary sheave 82 is maximum. Therefore, the CVT reaches its maximum transmission ratio.

As the rotational speed of the crankshaft 25 increases, the centrifugal force applied to the roller weights 90 increases. Thus, the roller weights 90 start moving radially outward of the movable sheave half 85 and are pressed against the cam faces 89 of the movable sheave half 85. This movement of the roller weights 90 causes the movable sheave half 85 to slide toward the fixed sheave half 84 and the width of the first belt groove 87 decreases. As a result, the belt 83 is pushed radially outward of the primary sheave half 81 and the diameter at which the belt 83 rides on the primary sheave 81 increases. On the secondary sheave 82, the belt 83 is pulled toward the center of rotation of the secondary sheave 82. The movable sheave half 93 therefore slides away from the fixed sheave half 92 against the urging force of the compression coil spring 98 and the width of the second belt groove 97 increases. Thus, the diameter at which the belt 83 rides on the secondary sheave 82 decreases. Then, the transmission ratio of the CVT 22 decreases, and, when the diameter at which the belt 83 rides on the primary sheave 81 reaches the maximum value, the transmission ratio of the CVT 22 becomes minimum.

Thus, the transmission ratio of the CVT 22 can be continuously varied by changing the diameters at which the belt 83 rides on the primary sheave 81 and the secondary sheave 82. The torque taken out by the secondary sheave 82 is transmitted from the fixed sheave half 92 to the gear transmission 34 via the output shaft 38, the centrifugal clutch 33 and the intermediate shaft 45.

Figure 8:
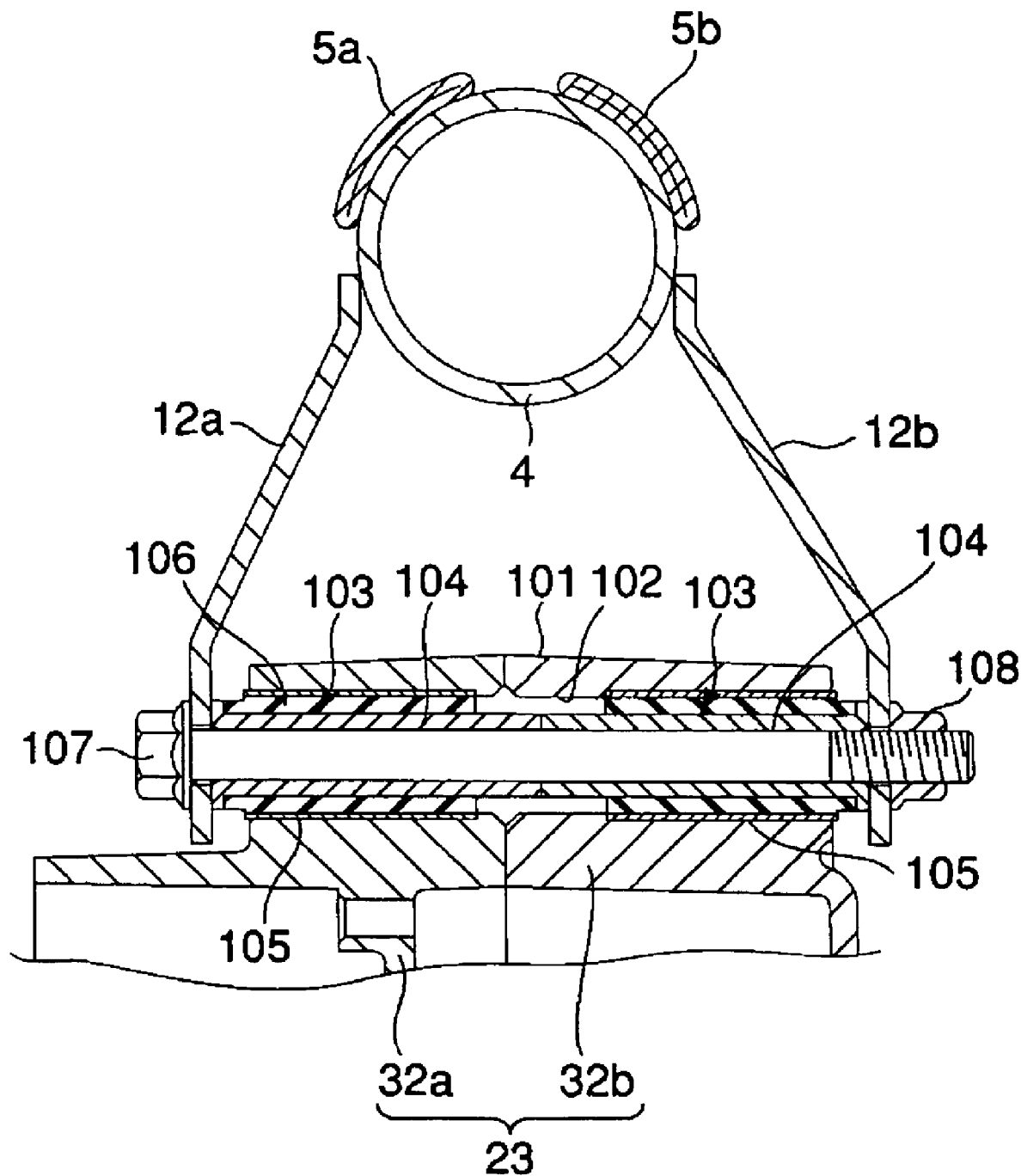
FIG. 8 is a cross-sectional view taken along the line F8-F8 in FIG. 3.

With reference to FIGS. 4 and 8, illustrated power unit 20 can be supported by the main frame member 4 of the frame 2 at the upper front end of the crankcase 23 and the upper rear end and lower rear end of the transmission case 31. Because the main frame member 4 is inclined downward as it extends backward from the steering head pipe 3 as shown in FIG. 3 and FIG. 4, the distance from the main frame member 4 to the upper side of the crankcase 23 decreases toward the rear. In other words, the distance between the upper side of the crankcase 23 and the main frame member 4 increases toward the front end of the crankcase 23.

A first boss part 101 protrudes upward from the upper front end of the crankcase 23. The first boss part 101 extends to a point between the lower ends of the first engine brackets 12a, 12b. The first boss part 101 has a through hole 102 extending in the vehicle width direction. A pair of engine mount dampers 103 can be fitted in the through hole 102. Each of the engine mount dampers 103 may comprise an inner sleeve 104, an outer sleeve 105 surrounding the inner sleeve 104, and a vibration absorbing rubber 106 interposed between the inner sleeve 104 and the outer sleeve 105. In some applications, the inner sleeve 104, the outer sleeve 105 and the vibration material 106 can be permanently affixed together. In the illustrated configuration, the inner sleeves 104 of the engine mount dampers 103 are sandwiched between the lower ends of the first engine brackets 12a, 12b and are coaxially in contact with each other in the through hole 102 while the outer sleeves 105 are press-fit in the through hole 102.

A first engine mount bolt 107 extends between the lower ends of the first engine brackets 12a, 12b. The first engine mount bolt 107 extends through the inner sleeves 104 of the engine mount dampers 103, and a nut 108 is threaded on the extended end of the first engine mount bolt 107. The first boss part 101 is therefore secured to the lower ends of the first engine brackets 12a, 12b and suspended by the main frame member 4 via the first engine brackets 12a, 12b.

As shown in FIG. 3 and FIG. 4, the rear end of the transmission case 31 is located immediately in front of the rear arm brackets 13a, 13b. The rear part of the first case block 32 of the transmission case 31 is located just below a rear part of the main frame member 4 that is inclined downward and rearward. The upper surface of the rear part of the first case block 32a inclines downward as it extends rearward. As a result, the recess 65 located at the rear end of the transmission case 31 has a bottom 65a inclined downward as it extends rearward along the main frame member 4.

As shown in FIG. 6, a second boss part 110 extends upward from the bottom 65a of the recess 65. The second boss part 110 can be formed integrally with the first case block 32a. The second boss part 110 can be located between the front ends of the rear arm brackets 13a, 13b, and has at its upper end portion a through hole 111 formed in the vehicle width direction.

The second boss part 110 has a height lower than the depth of the recess 65. In other words, the second boss part 110 is provided in such a position that it overlaps the rear end of the second case block 32b and the rear end of the CVT case 80 when the power unit 20 is viewed from the left side.

In the illustrated configuration, a pair of second engine brackets 112a, 112b is secured to a rear portion of the main frame member 4. The second engine brackets 112a, 112b preferably are located between the front ends of the rear arm brackets 13a, 13b. The second engine brackets 112a, 112b protrude downward from a rear portion of the main frame member 4 and face to each other with a distance there between in the vehicle width direction. The lower ends of the second engine brackets 112a, 112b advantageously are located in the recess 65 and sandwich the second boss part 110.

A second engine mount bolt 113 extends between the lower ends of the second engine brackets 112a, 112b. The second engine mount bolt 113 extends through the through hole 111 of the second boss part 110 and a nut 114 is threaded on the extended end of the second engine mount bolt 113. The second boss part 101 is thereby suspended from the rear portion of the main frame member 4 via the second engine brackets 112a and 112b. The joint between the second boss part 101 and the second engine brackets 112a and 112b advantageously is located in the recess 65.

As shown in FIG. 2, when the power unit 20 is suspended from the main frame member 4, the axis O1 of the cylinder 24 of the engine 21 is offset toward the CVT 22 from the longitudinal center line X1 of the frame 2 by a distance L. Thus, on the right side of the main frame member 4 are located the large CVT 22 which has the primary sheave 81 and the secondary sheave 82 of a large diameter, and the second case block 32b which houses the centrifugal clutch 33 of a large diameter. Accordingly, most of the larger diameter components are offset to one side of the frame member 4.

According to the above configuration, the recess 65, which opens toward the main frame member 4 extending above the transmission case 31, is formed in the top of a rear portion of the transmission case 31, and the second boss part 110 is formed on the bottom or base 65a of the recess 65. Also, the second engine brackets 112a, 112b protrude downward from a rear portion of the main frame member 4, and the lower ends of the second engine brackets 112a and 112b are connected to the second boss part 110 to suspend the rear part of the transmission case 31 from the main frame member 4.

In the illustrated embodiment, in particular, the lower ends of the second engine brackets 112a and 112b extend into the recess 65 and the joint between the second engine brackets 112a and 112b and the second boss part 110 is located in the recess 65. In other words, the second boss part 110 is located in such a position that it overlaps the upper rear end of the CVT case 80 housing the large CVT 22 when the power unit 20 is viewed from the left side.

Thus, because the second boss part 110 does not extend upward excessively above the transmission case 31 and the CVT case 80, the distance between a rear portion of the main frame member 4 and the transmission case 31 can be reduced. Therefore, the position of the main frame member 4 can be lowered while maintaining adequate height of the power unit 20 above the ground. As a result, the position of the seat 10 on the main frame member 4 can be lowered, which allows the rider to put both feet on the ground easily and to get on and off the motorcycle 1 stably and easily.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A motorcycle comprising a steering head pipe, a main frame member extending rearward from the steering head pipe, a power unit comprising a drive source and a power transmission device attached to an output end of the drive source, the power transmission device being positioned within a casing, the power transmission device comprising a centrifugal clutch and a gear train that is located at an output end of the centrifugal clutch, the centrifugal clutch having a diameter greater than that of the gear train, the casing comprising a recess that opens toward the main frame member and the recess being formed at a position offset from the centrifugal clutch, a boss being formed on a base of the recess, the boss being suspended from the main frame member such that the power unit is suspended from the main frame member.

2. The motorcycle of claim 1, wherein a bracket depends downward from the main frame member, the bracket having a lower end that is connected to the boss, and a joint between the lower end of the bracket and the boss being located in the recess.

3. The motorcycle of claim 1, wherein the casing further comprises a first case block and a second case block, the gear train being positioned generally within the first case block and the centrifugal clutch being positioned generally within the second case block, the first and the second case block being joined along a generally longitudinal connection and the boss being provided on the first case block.

4. The motorcycle of claim 1, wherein the drive source comprises an engine having a crankcase, the crankcase housing a crankshaft, a cylinder extending generally forward from a forward end of the crankcase, and the casing being positioned generally rearward of the crankcase and integrated with the crankcase.

5. The motorcycle of claim 4, wherein the main frame member is inclined generally downward as it extends rearward from the steering head pipe and the base of the recess being inclined generally downward as it extends toward the rear of the casing.

6. A motorcycle comprising a frame comprising a steering head pipe and a main frame member extending rearward from the steering head pipe, a power unit being suspended from the main frame member of the frame, the power unit comprising a drive source, the drive source comprising a casing, a continuously variable transmission being attached to the casing of the drive source and comprising a portion that extends upward to a location generally vertically higher than the casing, the continuously variable transmission comprising a primary sheave that can be driven by the drive source, a secondary sheave that is operatively connected to a power transmission device housed in the case, a belt connecting the primary sheave to the secondary sheave, the primary sheave, the secondary sheave and the belt being positioned within a CVT case, the CVT case comprising an upper portion that extends farther upward than the casing, the casing comprising a boss that is suspended from the main frame member, the boss being disposed on an upper portion of the casing and the boss being provided in such a position that it overlaps an upper portion of the continuously variable transmission when the power unit is viewed from a side and the upper portion of the CVT case being generally aligned with the boss in a longitudinal direction of the vehicle.

7. The motorcycle of claim 6, wherein the drive source comprises an engine, the engine comprising a crankcase, a crankshaft being positioned within the crankcase, a cylinder extending forward of a forward end of the crankcase, and the casing being located behind the crankcase and being integrated with the crankcase.

8. The motorcycle of claim 7, wherein the continuously variable transmission extends in a longitudinal direction of the power unit along one side of the crankcase and one side of the case, and the cylinder of the engine comprises an axis extending in the longitudinal direction of the power unit and offset toward the continuously variable transmission from a longitudinal center line of the frame.

9. The motorcycle of claim 6, wherein the power transmission device comprises a centrifugal clutch that receives torque from the secondary sheave, the centrifugal clutch and the secondary sheave being generally aligned in a vehicle width direction, and the boss being provided in a position that does not interfere with the centrifugal clutch and the secondary sheave.

10. The motorcycle of claim 6, wherein a bracket depends from the main frame member, the bracket comprising a lower end that is connected to the boss, and a joint between the boss and the bracket overlapping the continuously variable transmission when the power unit is viewed from one side.

11. The motorcycle of claim 6, wherein the main frame member inclines downward as it extends rearward from the steering head pipe, the upper portion of the case inclining downward as it extends rearward and the boss being located at a rear portion of the case.

* * * * *